2 Sheets—Sheet 1.

H. WIARD.
Plow.

No. 197,918. Patented Dec. 4, 1877.

Witnesses:
Thomas Johns
A. White

Inventor:
Harry Wiard
By J. J. Greenough
Atty.

2 Sheets—Sheet 2.

H. WIARD.
Plow.

No. 197,918. Patented Dec. 4, 1877

UNITED STATES PATENT OFFICE.

HARRY WIARD, OF SYRACUSE, NEW YORK.

IMPROVEMENT IN PLOWS.

Specification forming part of Letters Patent No. 197,918, dated December 4, 1877; application filed October 15, 1877.

*To all whom it may concern:*

Be it known that I, HARRY WIARD, of Syracuse, Onondaga county, New York, have invented certain Improvements in Plows, of which the following is a specification:

The improvements herein described are in the brace or cross-bar between the rear end of the mold-board and the land-side, made adjustable, and so formed and connected with the handles and at its ends as to firmly hold and elevate or depress the handles by being itself raised or lowered, and to be readily adjusted to any deviation in distance between the rear end of the mold-board and the land-side points of support. The lower ends of the handles are clamped and firmly held to a spreader formed to turn in its bearings, so as to allow freedom of adjustment in raising or lowering the upper ends of the handles. The land-side strip is made adjustable, so as to fit up closely at its front end to the point, to make a perfect joint there, allowing for any shrinkage of the parts. It has a capping-flange at the rear end, covering the joint between it and the land-side. The clevis is so made as to be readily shifted and held in place by the draft upon it. The shank of the wheel-standard is formed with a level face on the side next the plow-beam, with a row of recesses, into which a boss projecting from the side of the plow-beam can enter; or the standard can be used on a plain plow-beam without a boss on it, the face being level.

Figure 1:
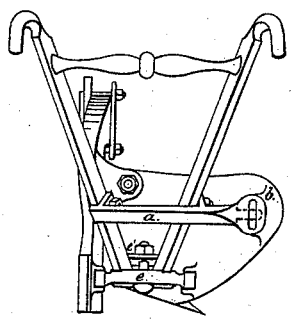
Figure 3:
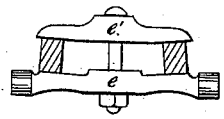
Figure 2:
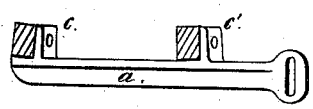
Figure 5:
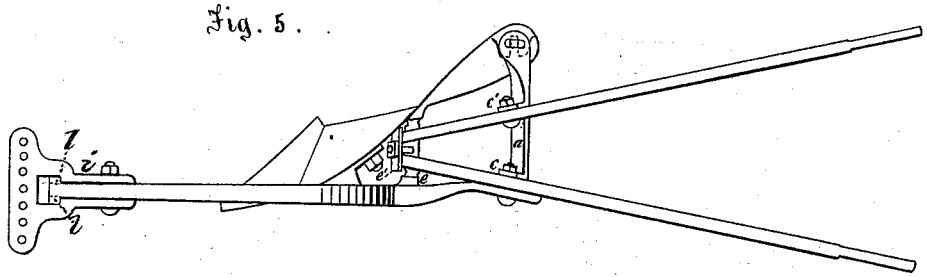
Figure 4:
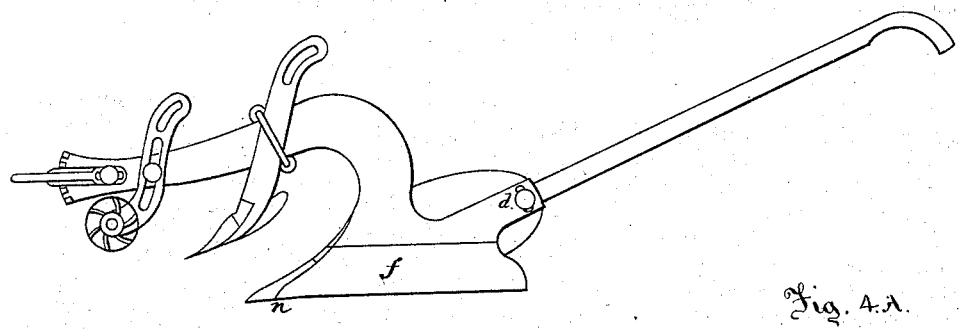
Figure 4:
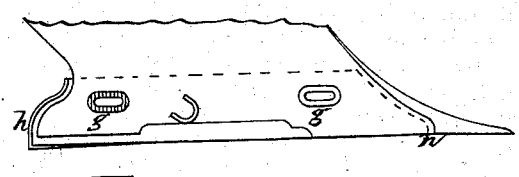
Figure 6:
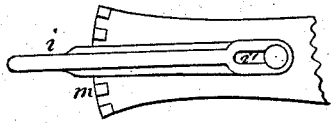
Figure 7:
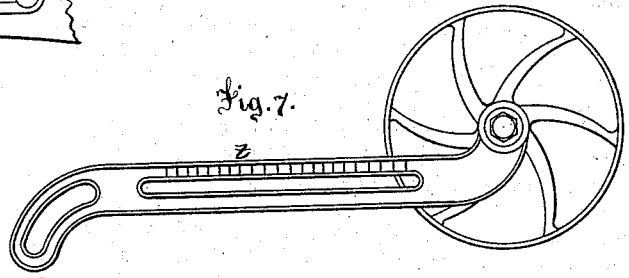

Referring to the accompanying drawings, Figure 1 is a rear view of the plow; Fig. 2, cross-bar *a* detached; Fig. 3, spreader-rocker; Fig. 4ᴬ, inside of the land-side; Fig. 4ᴮ, land-side view of the plow; Fig. 5, top plan of the plow; Fig. 6, side view of clevis; Fig. 7, standard, inside face next the beam.

The plow shown in the drawing is an improved chilled cast-iron plow and cast-iron beam, to which my present improvements are attached, some or all of which can be used on other plows, to which they are adapted.

The cross-bar or brace *a*, Figs. 1, 2, extends across from the land-side to the rear end of the mold-board, at a proper height for the plow-handles to rest on. This bar *a* is affixed to a lug, *b*, projecting from the inner surface of the mold-board, a screw-bolt passing through a horizontal slot in lug *b*, (shown by dotted lines in Fig. 1,) and through an oblong hole at right angles to the slot in the end of the bar *a*. On the upper side of this bar *a* are two lugs, *c c'*, to which the plow-handles are immovably bolted by screw-bolts passing horizontally through the lug and handle, to securely unite them. The bolt through lug *c* and the land-side handle also extends through the land-side at *d*, (see Fig. 4,) by which connection that end of the bar is adjusted to the desired height. This construction and arrangement of parts gives great strength and permanence to the connections, with an increased ease and simplicity of fitting and adjustment.

The spreader *e*, near the junction of the mold-board and point, is clearly shown detached at Fig. 3. Its ends are cylindrical, and fit into sockets on the inside of the mold-board and land-side at that point, and form a rocker, to which the lower ends of the plow-handles are affixed by a clamp, *e'*, united with the rocker by a screw-bolt, that extends down through the center of both parts, between the handles, and is drawn tight by a nut below, as seen in Fig. 3. As the bar *a* is raised or lowered, the spreader *e* turns to adjust it to the inclination of the handles, thus greatly reducing any strain on the parts, and reducing their liability to get broken. The land-side strip *f* is made to fit up to the point at the front end *n* by being bolted to the land-side through slots therein, as seen at *g*, Fig. 4ᴬ. At the rear end of this land-side strip *f* there is a flange, *h*, forming a cap, that covers the joint between it and the land-side. This adjustment of the land-side strip insures a perfect joint, regardless of the shrinkage. There are washers, through which the bolts that hold the land-side strip on, pass. The washers and seats may be serrated or wedge-formed, the front and rear inclining different ways, so as to hold the land-strip firmly in place.

The clevis *i*, Figs. 5, 6, spans the end of the plow-beam, and at the rear end is bolted to the plow-beam by a screw-bolt passing through a slot or slots therein at *i'*, so as to allow the clevis to slide back when the bolt is loosened. Opposite the front end of the plow-beam the opening in the clevis is enlarged.

Within this enlargement there is a projecting cog. (See dotted lines at $l$, Fig. 5.) On each side of the inner face, and on the segmental end of the plow-beam, there are cogs $m$, into which the cogs $l$ lock when drawn forward, and from which they are disconnected when the clevis is pushed back. In the latter position the clevis can be raised or lowered, to set it to the elevation desired, by bringing it forward into place again. This is readily done without removing the bolt, and, when drawing the clevis, is held in place, whether the nut on the bolt is loose or tight. The front end of the clevis is expanded horizontally, and has a row of holes along its front edge, to hitch into for lateral adjustment, in the usual way.

The inner face of the wheel-standard is made flush at its edges, presenting a plane surface, with a series of indentations, $t$, between them, as clearly seen in Fig. 7. A projecting boss, when formed on the side of the plow-beam where the standard is bolted on, enters one of the recesses, and prevents the standard from slipping up or down when bolted up to its place on the beam, while on beams where there is no boss the even surface of the standard fits the even surface of the beam, which is not the case where the face of the standard is serrated.

Having thus fully described my improvement in plows, I claim—

1. The adjustable bar $a$, constructed, arranged, and combined with the mold-board, land-side, and handles, as and for the purposes specified.

2. The spreader-rocker $e$, turning in sockets in the land-side and mold-board, and to which the ends of the handles are affixed by a cap and bolt, substantially as described, and for the purposes specified.

3. The combination of the clevis $i$, having slots $i'$ and cogs or lugs $l$ thereon, with the end of the plow-beam, having cogs $m$ projecting from its sides, so that the cogs $l$ enter between cogs $m$ when the clevis is drawn forward to retain it at the elevation desired.

HARRY WIARD.

Witnesses:
JAMES S. THORN,
J. J. GREENOUGH.